(12) United States Patent
Meserth et al.

(10) Patent No.: US 8,957,917 B2
(45) Date of Patent: *Feb. 17, 2015

(54) SYSTEMS AND METHODS FOR MANAGING ERRORS UTILIZING AUGMENTED REALITY

(75) Inventors: Timothy A. Meserth, Durham, NC (US); Mark E. Molander, Cary, NC (US); David T. Windell, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/527,677

(22) Filed: Jun. 20, 2012

(65) Prior Publication Data

US 2012/0257794 A1 Oct. 11, 2012

Related U.S. Application Data

(63) Continuation of application No. 13/082,291, filed on Apr. 7, 2011.

(51) Int. Cl.
*G09G 5/00* (2006.01)
*G06F 17/30* (2006.01)
(Continued)

(52) U.S. Cl.
CPC ............ *G09G 5/00* (2013.01); *G06F 17/30247* (2013.01); *G06F 17/30* (2013.01); *G06F 11/07* (2013.01); *G06T 11/00* (2013.01)
USPC ............ 345/633; 345/632; 382/103; 709/224

(58) Field of Classification Search
CPC ....... G06T 19/006; G06T 19/00; G06F 3/011; G06F 3/012; G06F 3/0304

USPC .................... 345/632–633; 382/103; 709/224
See application file for complete search history.

(56) References Cited

U.S. PATENT DOCUMENTS 6,774,869 B2 8/2004 Biocca et al.
7,372,451 B2 * 5/2008 Dempski ........................ 345/158
(Continued)

FOREIGN PATENT DOCUMENTS

CN 101101505 A 1/2008
DE 102008012122 A1 9/2009
(Continued)

OTHER PUBLICATIONS

Hamid et al.; 2010; A Network Troubleshooting System Using Augmented Reality Technology; Information Processing Society of Japan.*

(Continued)

*Primary Examiner* — Jeffery A Brier
*Assistant Examiner* — Todd Buttram
(74) *Attorney, Agent, or Firm* — Griffiths & Seaton PLLC

(57) ABSTRACT

Methods for managing errors utilizing augmented reality are provided. One system includes a transceiver configured to communicate with a systems management console, capture device for capturing environmental inputs, memory storing code comprising an augmented reality module, and a processor. The processor, when executing the code comprising the augmented reality module, is configured to perform the method below. One method includes capturing an environmental input, identifying a target device in the captured environmental input, and querying the systems management console regarding a status condition for the target device. Also provided are physical computer storage mediums including a computer program product for performing the above method.

5 Claims, 4 Drawing Sheets

(51) Int. Cl.
*G06F 11/07* (2006.01)
*G06T 11/00* (2006.01)

(56) References Cited

U.S. PATENT DOCUMENTS

| | | | |
|---|---|---|---|
| 7,907,901 | B1 | 3/2011 | Kahn et al. |
| 2007/0093955 | A1 | 4/2007 | Hughes |
| 2008/0008202 | A1* | 1/2008 | Terrell et al. ............... 370/401 |
| 2009/0167509 | A1* | 7/2009 | Fadell et al. ............... 340/407.2 |
| 2009/0167919 | A1 | 7/2009 | Anttila et al. |
| 2010/0030493 | A1 | 2/2010 | Rao |
| 2011/0055049 | A1* | 3/2011 | Harper et al. ............... 705/27.1 |
| 2011/0254671 | A1* | 10/2011 | Okimoto et al. ............ 340/407.1 |
| 2012/0249588 | A1* | 10/2012 | Tison et al. ................. 345/633 |

FOREIGN PATENT DOCUMENTS

| | | |
|---|---|---|
| JP | 2010219879 A | 9/2010 |
| WO | WO2010113466 A1 | 10/2010 |

OTHER PUBLICATIONS

Schoening et al.; "Improving the communication of spatial information in crisis response by combining paper maps and mobile devices"; INSPEC/Springer; pp. 57-65; 2009.

Loo et al.; "Declarative Networking"; ACM Digital Library; vol. 52, No. 11, pp. 87-95; Nov. 2009.

U.S. Appl. No. 13/082,298, entitled "Systems and Methods for Managing Computing Systems Utilizing Augmented Reality," as filed on Apr. 7, 2011, 28 pages.

* cited by examiner

SYSTEMS AND METHODS FOR MANAGING ERRORS UTILIZING AUGMENTED REALITY

CROSS-REFERENCE TO RELATED APPLICATIONS

This application is a Continuation of U.S. patent application Ser. No. 13/082,291, filed on Apr. 7, 2011.

BACKGROUND OF THE INVENTION

1. Field of the Invention

The present invention relates generally to computing systems, and more particularly to, systems and methods for managing errors utilizing augmented reality.

2. Description of the Related Art

Augmented reality is utilized primarily to passively obtain information regarding a particular location identified in a captured image. For example, a user can obtain the menu of a particular restaurant via augmented reality utilizing a captured image of the restaurant. In this example, a captured image of the exterior of the restaurant is used to identify the restaurant. Once the restaurant is identified, a user is capable of obtaining previously stored information related to the restaurant (e.g., the menu, consumer rating, location, etc.). While obtaining information via augmented reality is helpful in many situations, contemporary uses of augmented reality are limited.

SUMMARY OF THE INVENTION

Various embodiments provide systems for managing errors utilizing augmented reality. One system comprises a transceiver configured to communicate with a systems management console; capture device for capturing environmental inputs, memory storing code comprising an augmented reality module, and a processor coupled to the transceiver, the capture device, and the memory. In one embodiment, the processor, when executing the code comprising the augmented reality module, is configured to capture an environmental input via the capture device, identify a target device in the captured environmental input, and query, utilizing the transceiver, the systems management console regarding a status condition of the target device.

Other embodiments provide methods for managing errors utilizing augmented reality in a system including a transceiver configured to communicate with a systems management console, a capture device for capturing environmental inputs, memory storing code comprising an augmented reality module, and a processor coupled to the transceiver, the capture device, and the memory. One method comprises capturing an environmental input via the capture device, identifying, via the processor, a target device in the captured environmental input, and querying, by the processor utilizing the transceiver, the systems management console regarding a status condition of the target device.

Physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for managing errors utilizing augmented reality in a system including a transceiver configured to communicate with a systems management console, a capture device for capturing environmental inputs, memory storing code comprising an augmented reality module, and a processor coupled to the transceiver, the capture device, and the memory are also provided. One physical computer storage medium comprises computer code for capturing an environmental input via the capture device, computer code for identifying, via the processor, a target device in the captured environmental input, and computer code for querying, by the processor utilizing the transceiver, the systems management console regarding a status condition of the target device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide systems and methods for managing errors utilizing augmented reality. Also provided are physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for managing errors utilizing augmented reality in a system (e.g., a computing system).

Figure 1:
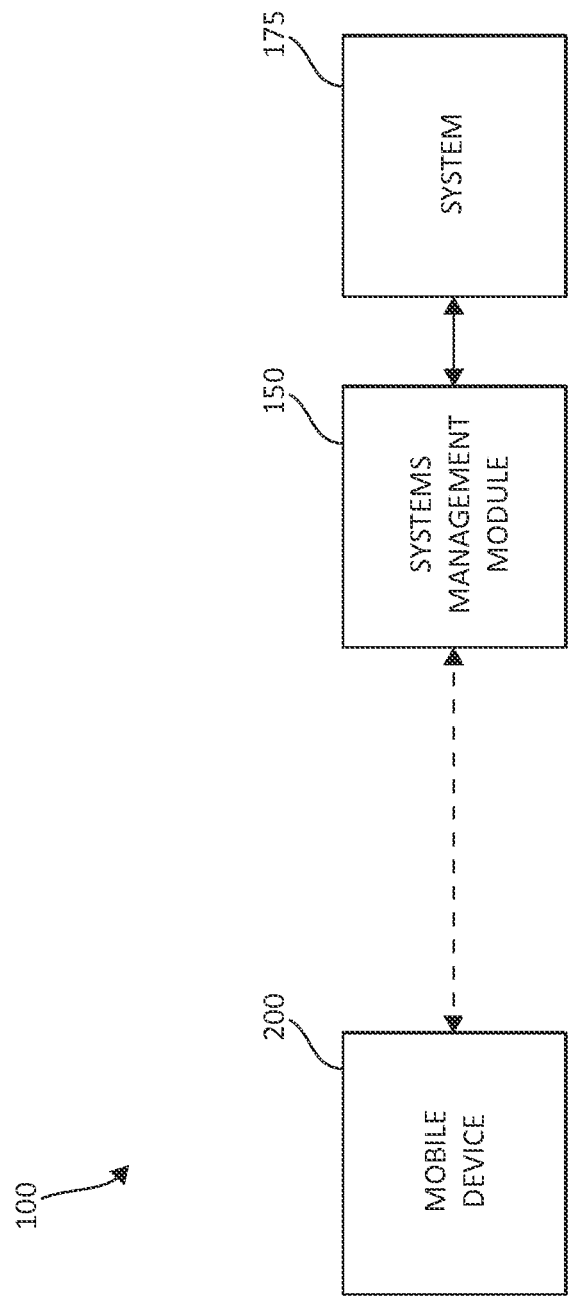
FIG. 1 is a block diagram of one embodiment of a system for managing errors utilizing augmented reality.

Turning now to the figures, FIG. 1 is a block diagram of one embodiment of a system 100 for managing errors utilizing augmented reality. At least in the illustrated embodiment, system 100 comprises a systems management console 150 configured to manage a system 175, which may be external to and/or included as a portion of system 100. System 100 further comprises a mobile device 200 in communication with systems management console 150.

Systems management console 150 is coupled to and configured to manage system 175. As such, systems management console 150 may be any console capable of monitoring system 175 for various statuses of operation or status of system 175. The various statuses include, but are not limited to, normal operation, an error state, a warning state, and the like status. In doing so, systems management console 150 is configured to identify any status and change in status, transmit such status to a querying device, and receive input from one or more users (via the querying device) to repair/correct/troubleshoot any identified errors and/or warnings.

System 175 may be any system and/or device capable of being monitored by systems management console 150, having any statuses identified by systems management console 150, and having any identified errors and/or warning repaired/corrected by systems management console 150. In one embodiment, system 175 comprises one or more computing devices 1752 (e.g., one or more servers, one or more storage devices, one or more power supplies, one or more blade chassis, etc.) in communication with systems management console 150.

In various embodiments, each of the one or more computing devices 1752 in system 175 comprises an identifier 1754, which may be any type of identifier known in the art or developed in the future. In one embodiment, each identifier 1754 is a bar code or other type of alphanumeric identifier. In another embodiment, each identifier 1754 is a radio frequency identifier (RFID) device (e.g., a RFID tag). In yet another embodiment, the location of the each respective computing device 1752 is the identifier 1754 for each computing device 1752. In this embodiment, the location may be with respect to a fixed object, with respect to the environment within each computing device 1752 resides, and/or with respect to a global position of each computing device. In still another embodiment, the shape, color, size, and/or other physical characteristic of each computing device 1752 is the identifier 1754 for each respective computing device 1752. In an alternative embodiment, a sound, noise, and/or other auditory cue generated by each respective computing device 1752 is the identifier 1754 for each respective computing device 1752. In yet another alternative embodiment, a vibration, a motion, and/or other tactile cue generated by each respective computing device 1752 is the identifier 1754 for each respective computing device 1752.

Each identifier 1754, in one embodiment, is the same type of identifier. For example, each identifier may be a bar code or other alphanumeric identifier that uniquely distinguishes each computing device 1752. In another embodiment, at least two computing devices 1752 include different types of identifiers 1754. For example, a first identifier 1754 on a first computing device 1752 may be a bar code and a second identifier 1754 for a second computing device 1752 may be the global position of the second computing device. Regardless of the type of identifier 1754, mobile device 200 is capable of capturing an environmental input including the identifier 1754.

Figure 2:
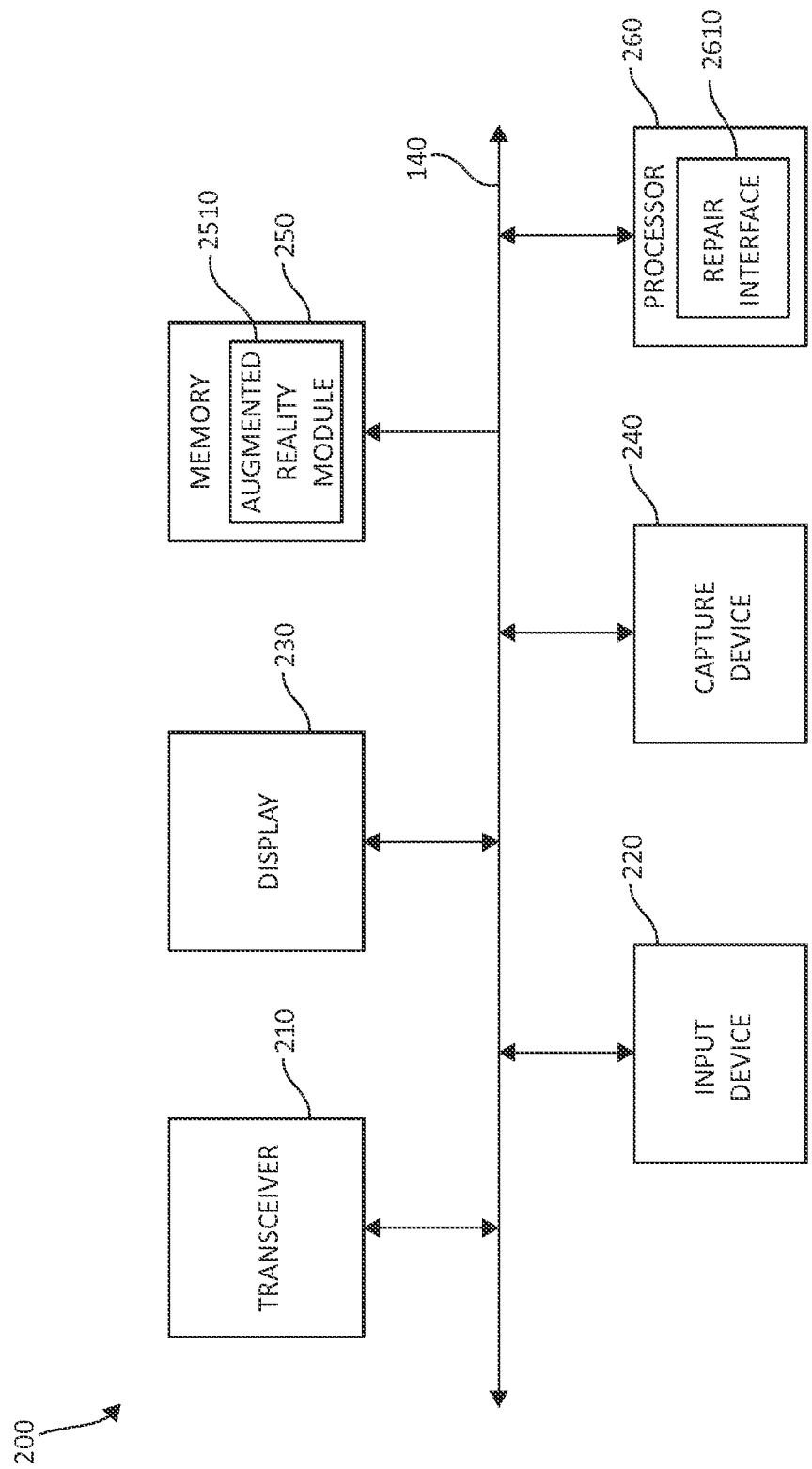
FIG. 2 is a block diagram of one embodiment of a mobile device utilized in the system of FIG. 1.

With reference now to FIG. 2, FIG. 2 is a block diagram of one embodiment of mobile device 200 utilized in system 100 of FIG. 1. At least in the illustrated embodiment, mobile device 200 comprises a transceiver 210, one or more input devices 220, a display 230, one or more capture devices 240, a memory 250, and a processor 260 coupled to one another via a bus 270 (e.g., a wired and/or wireless bus).

Transceiver 210 may be any system and/or device capable of communicating (e.g., transmitting and receiving data and/or signals) with systems management console 150. As such, transceiver 210 may be any transceiver known in the art or developed in the future.

Input device(s) 220 may be any system and/or device capable of receiving input from a user. Examples of input devices 220 include, but are not limited to, a mouse, a keyboard, a microphone, a touch screen, and the like input devices. As such, input device(s) 220 may be input device known in the art or developed in the future. In the various embodiments, each input device 220 is in communication with display 230.

Display 230 may be any system and/or device capable of displaying data. As such, display 230 may be any display known in the art or developed in the future. In one embodiment, display 230 includes a touch screen such that display 230 and input device 220 are integrated devices. In various embodiments, display 230 is configured to display data received from systems management console 150, input device(s) 230, and one or more capture devices 240.

Capture device(s) 240 may be any system and/or device capable of capturing environmental inputs (e.g., visual inputs, audio inputs, and tactile inputs). Examples of capture devices 240 include, but are not limited to, a camera, a microphone, a global positioning system (GPS), a gyroscope, a plurality of accelerometers, and the like capture devices. As such, capture device(s) 240 may be any capture device known in the art of developed in the future. In one embodiment, capture device 240 is a camera configured to capture images of the environment surrounding mobile device 200.

Memory 250 may be any system and/or device capable of storing data. In one embodiment, memory 250 stores computer code comprising an augmented reality module 2510. Augmented reality module 2510 comprises instructions that, when executed by processor 260, causes processor 260 to perform a method of managing errors in system 175.

Processor 260 is configured to execute the computer code comprising augmented reality module 2510. When executing augmented reality module 2510, processor 260 is configured to receive and process a captured environmental input representing at least a portion of system 175 from capture device 240.

In processing the captured environmental input, processor 260 is configured to identify one or more target devices in system 175 that are represented in the captured environmental input. For example, if the captured environmental input is an image of at least a portion of system 175, processor 260 is configured to identify one or more target devices in the captured image.

Processor 260 is configured to identify each target device utilizing the identifier 1754 for each respective target device. For example, in a captured image of system 175, processor 260 is configured to identify each target device via a bar code and/or other visual cue(s). In another example, in a captured audio clip of system 175, processor 260 is configured to identify each target device via a sound, noise, and/or other audio cue(s). In still another example, in a captured tactile bit of system 175, processor 260 is configured to identify each target device via a motion, vibration, and/or other tactile cue(s).

After the target device(s) is/are identified, processor 260 is configured to query systems management console 150 regarding the identified target device(s). In response thereto, processor 260 is configured to receive from systems management console 150 one or more status conditions and overlay the status condition(s) on the captured environmental input. For example, if the captured environmental input is an image of the target device(s), processor 260 is configured to overlay one or more status conditions on the image or portions of the image representing one or more components of the target device(s).

Figure 3:
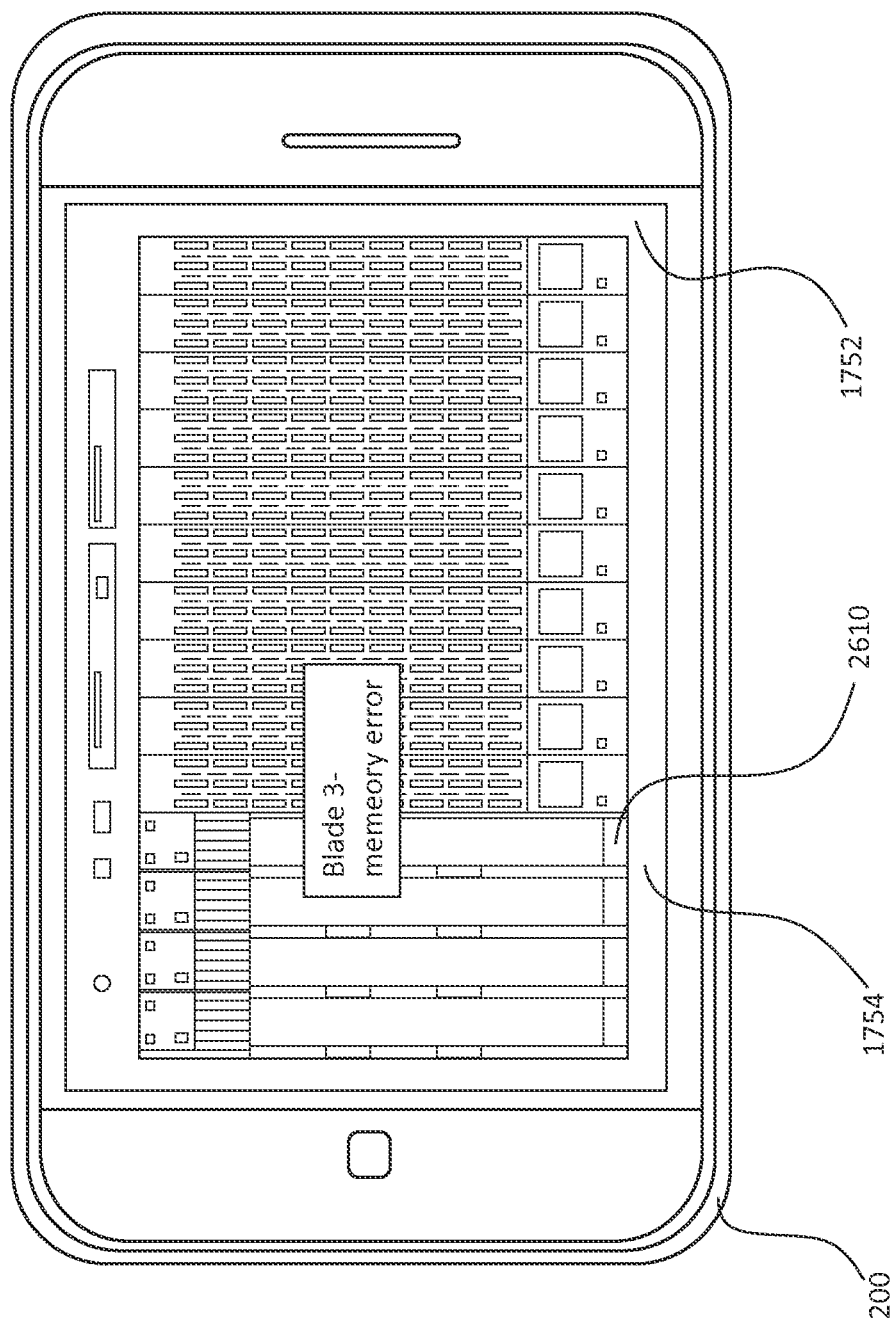
FIG. 3. Is a diagram of one embodiment of a repair interface included within the mobile device of FIG. 2.

Furthermore, processor 260 is configured to present to a user cues (audio cues, visual cues (e.g., a hyperlink), tactile cues, etc.) for accessing and launching a repair interface 2610 (see FIG. 3) when an error or warning is received from systems management console 150. Repair interface 2610 enables a user to repair/correct an error and/or warning condition on the target device. In one embodiment, repair interface 2610 launches directly to a problem page for the determined error/warning condition via, for example, a shortcut. In another embodiment, repair interface 2610 launches to a general error/warning condition home page from which the user is able to navigate through an error/warning condition decision tree until the user determines the appropriate action/correction.

In one example, if the power indicator on system 175 is "OFF," processor 260 will receive from systems management console 150 the reason the power is "OFF" on the target device. In this example, systems management console 150 may indicate that the main power supply is experiencing problems and/or present a error log and instruct processor 260 to display the problem and/or error log to the user. Processor 260 will then display the problem and/or error log on display 230 and launch repair interface 2610 so that the user is able to address the error condition.

Repair interface 2610 enables the user to remotely utilize systems management console 150 to repair/correct the determined fault condition. To accomplish this, the user provides inputs (e.g., via input device(s) 220) to repair interface 2610. Processor 260 is configured to then transmit (e.g., via transceiver 210) the inputs to systems management console 150, which then repairs/corrects the determined error condition in system 175.

In continuation to the above example, the user may instruct (e.g., via inputs to repair interface 2610) systems management console 150 to initiate an auxiliary power supply to the target device. In response thereto, systems management console 150 will initiate the auxiliary power supply to correct the determined fault condition.

In one embodiment, mobile device 200 is a cellular telephone (e.g., a "smart" phone). In other embodiments, mobile device 200 is a computing tablet, a notebook computing device, a netbook computing device, a laptop computing device, and/or the like computing device.

Figure 4:
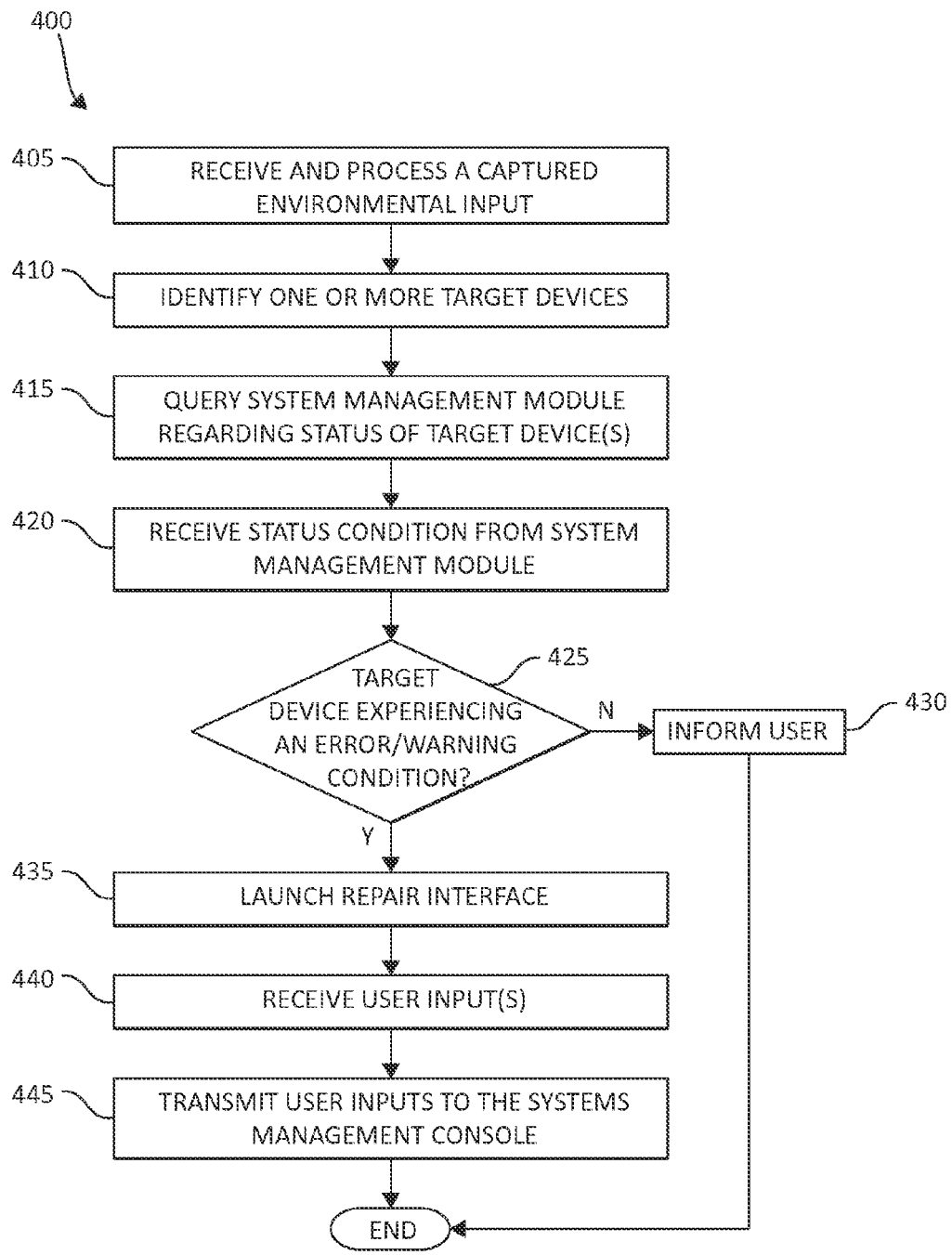
FIG. 4 is a flow diagram of one embodiment of a method for managing errors utilizing augmented reality.

Turning now to FIG. 4, FIG. 4 is a flow diagram of one embodiment of a method 400 for managing errors in a system (e.g., system 100) utilizing augmented reality. At least in the illustrated embodiment, method 400 starts by a processor (e.g., processor 260) receiving and processing a captured environmental input representing at least a portion of a system (e.g., system 175) from a capture device (e.g., capture device 240) (block 405).

In processing the captured environmental input, method 400 comprises identifying one or more target devices in the system that are represented in the captured environmental input (block 410). In one embodiment, method 400 utilizes a captured image of the system to identify each target device. In another embodiment, method 400 utilizes a captured audio clip of the system to identify each target device. In still another embodiment, method 400 utilizes a captured tactile bit of the system to identify each target device.

After the target device(s) is/are identified, method 400 comprises querying a systems management console (e.g., systems management console 150) regarding the status in the identified target device(s) (block 415). In response thereto, method 400 comprises receiving from the systems management console one or more status conditions for the target device(s) (block 420).

Method 400 further comprises determining if the target device(s) is/are experiencing an error and/or warning condition (block 425). If the status indicates that the target device(s) is/are not experiencing an error/warning condition (i.e., is/are functioning properly), the user is informed (block 430) and method 400 ends. If the status indicates that the target device(s) includes an error/warning condition, method 400 includes launching a repair interface (e.g., repair interface 2610) (block 435).

The target of the repair interface can be at a user interface (e.g., a display) on the mobile device and/or at user interface elements on the device(s) and/or system being monitored (e.g., system 175). For example, display elements on the display (e.g., brightness, flash rate frequency, audio volume, and the like) could be modified/enhanced to further augment the diagnostic task.

After the repair interface is launched, method 400 comprises receiving inputs (e.g., from a user) to the repair interface from the user (block 440). The inputs are then transmitted to the systems management console (block 445), which then repairs/corrects the determined fault condition in system in accordance with the received inputs. Method 400 then ends.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A method for managing errors utilizing augmented reality in a system including a transceiver configured to communicate with a systems management console, a capture device for capturing environmental inputs, memory storing code comprising an augmented reality module, an input device configured to receive inputs from a user, a display, and a processor coupled to the transceiver, the capture device, the memory, the input device, and the display, the method comprising:

capturing an environmental input from a target device, the environmental input including a tactile cue, via the capture device, the target device being remote from the system management console;

identifying, via the processor, a target device in the captured tactile cue;

querying, by the processor utilizing the transceiver, the systems management console regarding a status condition of the target device;

receiving, via the transceiver, information regarding the status condition from the systems management console;

displaying, via the display, the information regarding the status condition, and launching a repair interface directly to a problem page for a determined fault condition, if the status condition is a fault condition, for a user to address the fault condition;

synthesizing the received information and the captured tactile cue;

receiving, via the input device, an input to the repair interface from the user for troubleshooting the status condition when the status condition is the fault condition;

transmitting, via the transceiver, the input to the systems management console;

receiving, via the input device an other input from the user for correcting the fault condition; and transmitting, via the transceiver, the other input to the systems management console correcting the fault condition.

2. The method of claim 1, wherein identifying the target device comprises identifying an other target device via one of a bar code, a radio frequency identifier, and a position of the other target device.

3. The method of claim 1, wherein receiving the input from the user comprises receiving the input via one of a keyboard, a touch screen associated with the display, and a computing mouse.

4. The method of claim 1, wherein capturing the environmental input comprises capturing the environmental input utilizing a tactile capturing device.

5. The method of claim 1, wherein capturing the environmental input further comprises capturing a visual image of the target device utilizing a camera.

* * * * *